April 9, 1957  C. O. CHRISTENSEN  2,788,220
PALLET DOLLY
Filed July 23, 1954  2 Sheets-Sheet 1
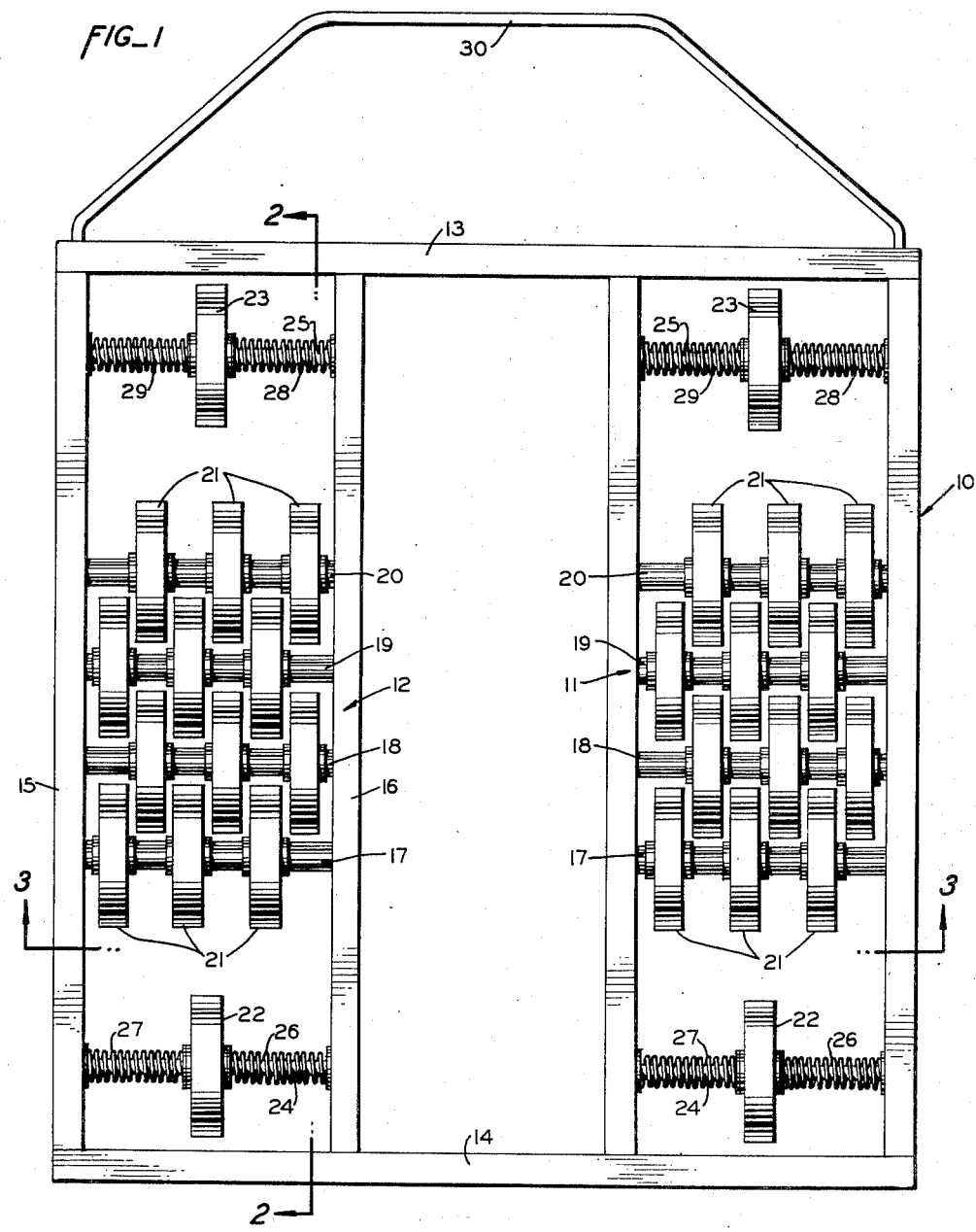
INVENTOR.
CARL O. CHRISTENSEN
BY
Mellin and Hanscom
ATTORNEYS April 9, 1957     C. O. CHRISTENSEN     2,788,220
PALLET DOLLY
Filed July 23, 1954     2 Sheets-Sheet 2
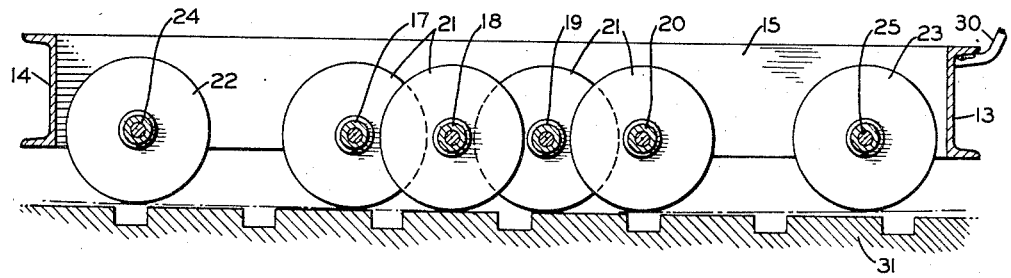
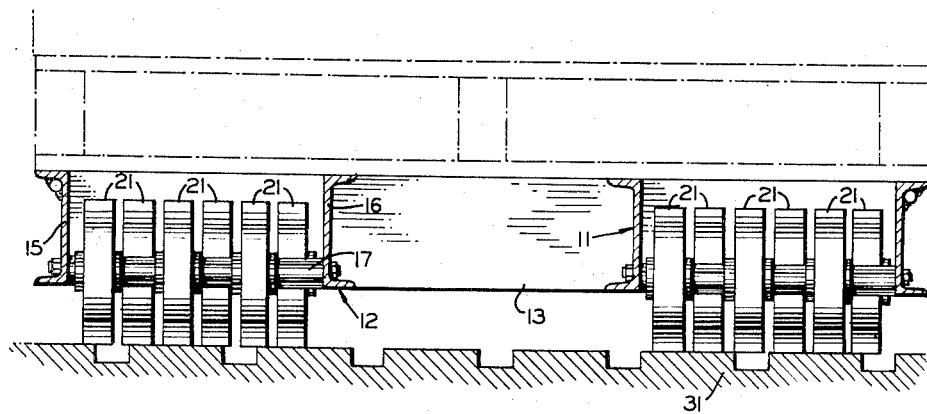
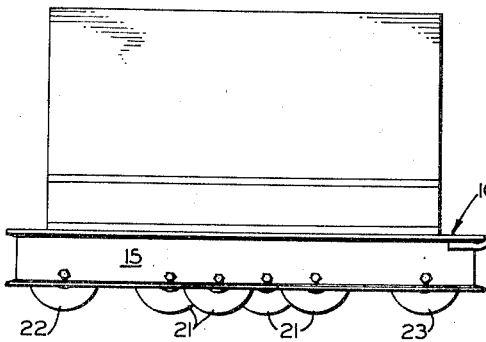
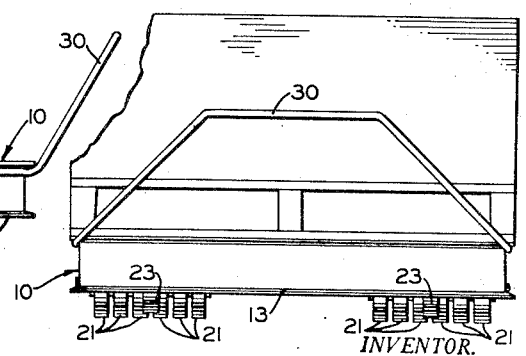
INVENTOR.
CARL O. CHRISTENSEN
BY
Meelin and Hanscom
ATTORNEYS ated Apr. 9, 1957

United States Patent Office

2,788,220
PALLET DOLLY

Carl O. Christensen, Walnut Creek, Calif., assignor to Roll-Rite Corporation, Oakland, Calif., a corporation of California Application July 23, 1954, Serial No. 445,326

2 Claims. (Cl. 280—47.16)

This invention relates to a vehicle for transporting goods and freight and particularly to a dolly adapted to transport a unit pallet load of freight relatively short distances from one place to another.

It is common practice in material handling to build up unit loads on a pallet and to transport said pallet loads from one place to another by means of a fork lift truck. In many instances it is inconvenient or impossible to take the fork lift truck all the way to the desired point of unloading; for example, fork lift trucks are not allowed to enter refrigerator railroad cars. If it were not for dollies such as disclosed herein, the load would have to be deposited outside the car door and carried item by item into the car by hand. By the use of a dolly such as disclosed herein, the unit pallet load may be deposited on the dolly and rolled into the car to a point adjacent the area where the items comprising the load are to be stacked, thus greatly reducing the time necessary to load a car. It is obvious that a pallet used for this purpose must be steerable in order to be maneuvered into proper position on the car, and must also be capable of withstanding the impact loading of the unit pallet load as it is deposited on the dolly by a fork lift truck.

A main object of the present invention is to provide a pallet dolly having a centrally arranged gang of main wheels capable of sustaining a unit impact load when the pallet is placed on the dolly, and which is further provided with laterally slidable end wheels adapted to cooperate with said main wheels to assist the dolly in traversing ramps or other inclined surfaces.

A further object of the present invention is to provide a pallet dolly as above which is specially adapted to travel over a slatted surface, such as found in railroad refrigerator cars, particularly a dolly which can be readily navigated parallel to or transverse of such a slatted surface.

A still further object of the invention is to provide a pallet dolly as above wherein the wheels are arranged so that the ground or floor-engaging surface of each wheel is tangent to a common arc, whereby only a relatively few wheels are in contact with the supporting surface when the dolly is turned, thus facilitating the turning of the dolly.

The preferred embodiment of the present invention is described in the following detailed specification and illustrated by way of example in the accompanying drawings, wherein:

Fig. 1 is a plan view of a dolly embodying the principles of my invention.

Fig. 2 is a sectional view taken on line 2—2 of Fig. 1.

Fig. 3 is a sectional view taken on line 3—3 of Fig. 1.

Figs. 4 and 5 are schematic views of the dolly shown in Figs. 1–3 and illustrate the type of loading for which the dolly is designed.

Referring now to the drawing, wherein similar reference numerals are used to denote the same elements throughout the various views shown, 10 generally indicates a pallet dolly having two identical wheel assemblies 11 and 12 connected together in parallel spaced relation by two channel-shaped end members 13 and 14. Since both of the wheel assemblies 11 and 12 are identical only the assembly 12 will be described in detail.

The assembly 12 is comprised of two channel-shaped side members 15 and 16 which are parallel to each other and have their open side facing outwardly. Four axle members 17 to 20, inclusive, are mounted crosswise between the members 15 and 16 adjacent the mid-portions thereof. The axles are equally spaced from each other and, as can best be seen in Fig. 2, the axles are arranged to lie on a common arc described about an axis vertically above the mid-point of the assembly 12 for purposes which will be described presently. As shown, three wheels 21 are mounted for individual rotation on each of the axles 17 to 20, inclusive. The wheels are staggered with relation to each other so that the wheels on one axle extend between the wheels on the next axle, in the manner shown in Fig. 1, in order to concentrate the wheels as near as possible to the mid-point of the assembly. It will be appreciated that more or fewer wheels may be mounted on each axle, depending on the loading for which the pallet dolly assembly 10 is designed. There should be sufficient wheels mounted on any one axle so that these wheels, together with those mounted on the aligned axle in the wheel assembly 11, can take the full impact loading of a unit pallet load. The number of wheels should be kept to a minimum, however, since the more wheels there are on each axle, the greater will be the resistance to turning movment of the dolly.

A pair of outrigger wheels 22 and 23 are mounted, one adjacent the front and one adjacent the rear of the assembly, on axles 24 and 25, respectively. The axles 24 and 25 are on the same arc as that described by axles 17 to 20, inclusive. The wheels 22 and 23 are each free to slide laterally on its respective axle and are normally maintained in the central portion thereof by coil springs 26 to 29, inclusive, surrounding the axles 24 and 25 and located one between each wheel and each side member 15 or 16, in the manner shown in Fig. 1. A U-shaped handle 30 is connected to the outer side member of each of the wheel assemblies and extends diagonally rearwardly and upwardly therefrom in the manner best seen in Fig. 4.

The dolly disclosed herein is obviously adapted to receive an impact loading of a unit pallet load on its central gang of wheels and, due to the arcuate arrangement of these wheels, only the wheels on any one or at the most two axles of each wheel assembly are in contact with the supporting surface at any one time, thus facilitating the steering of the dolly. The end wheels 22 and 23 aid the dolly in traversing ramps and other inclined surfaces, and due to their lateral slidability, it is possible to steer even when one of these wheels is in contact with the supporting surface.

The dolly presented herein is also adapted to easily negotiate a slatted surface, such as shown at 31 in Figs. 2 and 3. When one set of centrally disposed wheels drops into a crack or recess between slats, the set of wheels closest thereto will ride on the adjacent slat and, therefore, support the dolly for easy movement across the slatted surface, even though the dolly may be loaded quite heavily. In traveling longitudinally of a slatted surface, the provision of a plurality of laterally spaced wheels on each axle allows the wheels to be supported on the slatted surface, even though some of the wheels might tend to slip down between the slatted surfaces.

In loading the dolly, it is contemplated that the pallet will be deposited squarely on the dolly in the manner illustrated in Figs. 4 and 5. However, even if the pallet is off center and completely misses the outside longitudinal frame member on one side or the other, the pallet will be supported by the intermediate longitudinal frame members and will not rest on and jam the wheels 21.

While I have shown the preferred form of my invention, it is to be understood that various changes may be made in its construction by those skilled in the art, without departing from the spirit of the invention as defined in the appended claims.

Having thus described my invention, what I claim and desire to secure by Letters Patent is:

1. A pallet dolly comprising two identical wheel assemblies spaced laterally from each other, two transversely extending channel-shaped members connecting said wheel assemblies one adjacent each end thereof, each of said wheel assemblies comprising two longitudinally extending side members, a group of parallel, equally spaced axles extending laterally between said side members closely adjacent the mid-portion thereof, each of said axles lying on a common arc described about a transverse axis located a substantial distance vertically above the mid-portion of said assembly, a plurality of wheels on each of the axles, the wheels of one axle being staggered and in overlapping relation to the wheels on the axles next adjacent thereto, a pair of axles, one adjacent the front and rear ends respectively of said assembly and spaced considerably from said group of axles but lying on the same arc as said group of axles, a single wheel mounted for sliding movement on each axle of said pair of axles, a pair of coil springs surrounding one of said pair of axles one on either side of the wheel slidably mounted thereon and each of said springs confined between said wheel and a corresponding one of said side members, and another pair of coil springs surrounding the other of said pair of axles one on either side of the wheel slidably mounted thereon and each of said other springs confined between said last mentioned wheel and a corresponding one of said side members.

2. For use in the construction of a pallet dolly, a wheel assembly comprising two longitudinally extending side members, a group of equally spaced axles extending laterally between said side members closely adjacent the mid-portion thereof, each of said axles lying on a common arc described about a transverse axis located a substantial distance vertically above the mid-portion of said assembly, a plurality of equal diameter wheels on each of the axles, the wheels of one axle being staggered and in overlapping relation to the wheels on the axles next adjacent thereto, a pair of axles one adjacent the front and rear ends respectively of said assembly and spaced considerably from said group of axles but lying on the same arc as said group of axles, a single wheel mounted for sliding movement on each axle of said pair of axles, a pair of coil springs surrounding one of said pair of axles one on either side of the wheel slidably mounted thereon and each of said springs confined between said wheel and a corresponding one of said side members, and another pair of coil springs surrounding the other of said pair of axles one on either side of the wheel slidably mounted thereon and each of said other springs confined between said last mentioned wheel and a corresponding one of said side members.

References Cited in the file of this patent

UNITED STATES PATENTS

| | | |
|---|---|---|
| 954,993 | Peters | Apr. 12, 1910 |
| 1,270,383 | Crawford | June 25, 1918 |
| 2,468,055 | Gibler | Apr. 26, 1949 |
| 2,565,237 | Kinter | Aug. 21, 1951 |
| 2,720,989 | Wormser | Oct. 18, 1955 |

FOREIGN PATENTS

| | | |
|---|---|---|
| 898,358 | France | July 3, 1944 |
| 16,949 | Great Britain | Sept. 20, 1899 |
| 18,909 | Great Britain | Nov. 19, 1898 |